US012772195B2

(12) United States Patent
Zheng et al.

(10) Patent No.: US 12,772,195 B2
(45) Date of Patent: Oct. 20, 2026

(54) METHOD AND APPARATUS FOR TRANSMITTING AND RECEIVING SIDELINK POSITIONING REFERENCE SIGNAL

(71) Applicant: CICT CONNECTED AND INTELLIGENT TECHNOLOGIES CO., LTD., Chongqing (CN)

(72) Inventors: Shilei Zheng, Chongqing (CN); Chenxin Li, Chongqing (CN); Jinling Hu, Chongqing (CN); Rui Zhao, Chongqing (CN)

(73) Assignee: CICT CONNECTED AND INTELLIGENT TECHNOLOGIES CO., LTD., Chongqing (CN)

( * ) Notice: Subject to any disclaimer, the term of this patent is extended or adjusted under 35 U.S.C. 154(b) by 316 days.

(21) Appl. No.: 18/430,390

(22) Filed: Feb. 1, 2024

(65) Prior Publication Data

US 2024/0179667 A1 May 30, 2024

Related U.S. Application Data

(63) Continuation of application No. PCT/CN2022/108949, filed on Jul. 29, 2022.

(30) Foreign Application Priority Data

Aug. 2, 2021 (CN) ......................... 202110882902.2

(51) Int. Cl.
*H04W 64/00* (2009.01)
*H04L 5/00* (2006.01)
*H04W 72/25* (2023.01)

(52) U.S. Cl.
CPC ........... *H04W 64/00* (2013.01); *H04L 5/0005* (2013.01); *H04L 5/0048* (2013.01); *H04W 72/25* (2023.01)

(58) Field of Classification Search
CPC ..... H04W 72/25; H04W 24/10; H04W 72/40; H04W 72/0446; H04W 4/40;
(Continued)

(56) References Cited

U.S. PATENT DOCUMENTS

2015/0296359 A1* 10/2015 Edge ..................... G01S 1/0428 455/404.2
2016/0095080 A1* 3/2016 Khoryaev ............. G01S 5/0284 455/456.1

(Continued)

FOREIGN PATENT DOCUMENTS

CN 111669779 A 9/2020
CN 112583553 A 3/2021

(Continued)

OTHER PUBLICATIONS

Extended European Search Report issued in counterpart European Patent Application No. 22852060.7, dated Sep. 24, 2024.

(Continued)

*Primary Examiner* — Kwasi Karikari
(74) *Attorney, Agent, or Firm* — Westbridge IP LLC

(57) ABSTRACT

Disclosed are methods and an apparatus for transmitting and receiving a sidelink positioning reference signal, where the transmitting method applied to a first terminal includes: acquiring a time-frequency resource configuration parameter of the SL PRS; and determining a first resource, and transmitting, on the first resource, the SL PRS or the SL PRS and first indication information based on the time-frequency resource configuration parameter, where the first indication information is used to indicate transmission parameter information of the first resource.

16 Claims, 10 Drawing Sheets

(58) Field of Classification Search
CPC . H04W 72/0453; H04W 4/029; H04W 72/02; H04W 72/23; H04W 72/232; H04W 72/231; H04W 72/1263; H04W 72/56; H04W 72/044; H04W 52/0216; H04W 4/46; H04W 4/44; H04L 5/0048; H04L 5/0051; H04L 5/0053; H04L 5/00; H04L 5/0023; H04L 5/0037; H04L 5/0044; H04L 1/1887; H04L 25/0226; H04L 25/0224; H04L 5/06; H04L 25/0204; H04L 47/78
See application file for complete search history.

(56) References Cited

U.S. PATENT DOCUMENTS

| | | | |
|---|---|---|---|
| 2016/0095092 A1 | 3/2016 | Khoryaev et al. | |
| 2020/0359367 A1 | 11/2020 | Tang et al. | |
| 2021/0297206 A1* | 9/2021 | Manolakos | H04W 72/0446 |
| 2022/0166575 A1* | 5/2022 | Yerramalli | H04L 5/0007 |
| 2022/0321294 A1 | 10/2022 | Ren et al. | |
| 2022/0385423 A1 | 12/2022 | Ko et al. | |
| 2023/0052126 A1* | 2/2023 | Nam | H04L 5/00 |

FOREIGN PATENT DOCUMENTS

| | | | |
|---|---|---|---|
| CN | 112994858 | A | 6/2021 |
| CN | 113055136 | A | 6/2021 |
| EP | 3751929 | A1 | 12/2020 |
| JP | 2021516485 | A | 7/2021 |
| JP | 2022545389 | A | 10/2022 |
| WO | 2019153129 | A1 | 8/2019 |
| WO | 2021030583 | A1 | 2/2021 |
| WO | 2021066592 | A1 | 4/2021 |
| WO | 2021086093 | A1 | 5/2021 |

OTHER PUBLICATIONS

VIVO, Discussion on potential solutions for sidelink positioning, R1-2203566, 3GPP TSG RAN WG1 #109-e, dated Apr. 29, 2022.

ZTE, Discussion on potential solutions for SL positioning, R1-2203624, 3GPP TSG RAN WG1 #109-e, dated Apr. 29, 2022.

International Search Report and Written Opinion issued in corresponding PCT Application No. PCT/CN2022/108949, dated Sep. 21, 2022.

Oppo, Discussion on sidelink positioning, RWS-210048, 3GPP TSG RAN Rel-18 Workshop Electronic Meeting, dated Jun. 7, 2021.

3GPP, TS 38.211 V16.6.0, NR, Physical channels and modulation, dated Jun. 22, 2021.

Request for the Submission of an Opinion issued in counterpart Korean Patent Application No. KR 10-2024-7003643, dated Dec. 22, 2025.

* cited by examiner

METHOD AND APPARATUS FOR TRANSMITTING AND RECEIVING SIDELINK POSITIONING REFERENCE SIGNAL

CROSS-REFERENCE TO RELATED APPLICATIONS

This application is a continuation of International Application No. PCT/CN2022/108949, filed on Jul. 29, 2022, which claims priority to Chinese Patent Application No. 202110882902.2, filed on Aug. 2, 2021. The disclosures of the aforementioned applications are hereby incorporated by reference in their entireties.

TECHNICAL FIELD

The present application relates to the technical field of communications, and in particular, to a method and an apparatus for transmitting and receiving a sidelink positioning reference signal.

BACKGROUND

3GPP Release 16 (3rd Generation Partnership Project Release 16) performs research and standardization on NR positioning (uplink and downlink in a cellular network). In coverage of a cellular network, a base station transmits a cell-specific downlink positioning reference signal (PRS for short), and a terminal transmits an uplink sounding reference signal (SRS for short) used for positioning in uplink, to correspondingly measure a reference signal time difference (RSTD), or measure a reference signal received power (RSRP) of the downlink positioning reference signal (DL PRS), or measure a time difference between a time at which the terminal receives the DL PRS and a time at which the terminal transmits the SRS. The base station may measure a relative time of arrival (RTOA) in uplink, an RSRP of the SRS, a time difference between a time at which a 5G base station (gNB) receives the SRS and a time at which the gNB transmits the DL PRS, an angle measurement value, and the like. A location of a user equipment (UE) is calculated by processing measurement values.

The work related to research and standardization of sidelink positioning is being actively performed. However, sidelink is different from downlink and uplink. Because a scenario of gNB scheduling may not exist, a corresponding sidelink PRS needs to be redesigned based on a resource selection and a physical layer structure feature of the sidelink, and the like, to adapt to the sidelink positioning technology. In Release 16 or Release 17, no positioning related feature is introduced in sidelink. In addition, the physical layer channel structure of sidelink is different from those of the downlink and uplink, so that an existing DL PRS and SRS for positioning cannot be directly applicable to sidelink.

SUMMARY

A technical objective to be achieved in embodiments of the present application is to provide a method and an apparatus for transmitting and receiving a sidelink positioning reference signal, to solve a problem that positioning cannot be performed currently because no base station participates in scheduling and a physical layer channel structure form is different from a channel that has been known.

To solve the foregoing technical problem, an embodiment of the present application provides a method for transmitting a sidelink positioning reference signal SL PRS, which is applied to a first terminal and includes:

acquiring a time-frequency resource configuration parameter of a sidelink positioning reference signal (SL PRS for short); and determining a first resource, and transmitting, on the first resource, the SL PRS or the SL PRS and first indication information based on the time-frequency resource configuration parameter, where the first indication information is used to indicate transmission parameter information of the first resource.

Another optional embodiment of the present application further provides a method for receiving a sidelink positioning reference signal SL PRS, which is applied to a second terminal and includes:

acquiring a time-frequency resource configuration parameter of the SL PRS; and receiving, on the first resource, the SL PRS or the SL PRS and first indication information based on the time-frequency resource configuration parameter, where the first indication information is used to indicate transmission parameter information of the first resource.

Still another optional embodiment of the present application further provides an apparatus for transmitting a sidelink positioning reference signal SL PRS, which is applied to a first terminal and includes:

a first processing module, configured to acquire a time-frequency resource configuration parameter of the SL PRS; and a second processing module, configured to: determine a first resource, and transmit, on the first resource, the SL PRS or the SL PRS and first indication information based on the time-frequency resource configuration parameter, where the first indication information is used to indicate transmission parameter information of the first resource.

Yet still another optional embodiment of the present application further provides an apparatus for receiving a sidelink positioning reference signal SL PRS, which is applied to a second terminal and includes:

a third processing module, configured to acquire a time-frequency resource configuration parameter of the SL PRS; and a fourth processing module, configured to: determine a first resource, and receive, on the first resource, the SL PRS or the SL PRS and first indication information based on the time-frequency resource configuration parameter, where the first indication information is used to indicate transmission parameter information of the first resource.

Another optional embodiment of the present application further provides a computer-readable storage medium, on which a computer program is stored. When the computer program is executed by a processor, the method for transmitting a sidelink positioning reference signal SL PRS applied to a first terminal, or the method for receiving a sidelink positioning reference signal SL PRS applied to a second terminal is implemented.

Compared with a related technology, the methods and apparatuses for transmitting and receiving a sidelink positioning reference signal provided in embodiments of the present application have at least the following beneficial effects.

In embodiments of the present application, a time-frequency resource configuration parameter of an SL PRS is acquired, and the SL PRS is carried on a first resource for transmitting and receiving based on the time-frequency resource configuration parameter. In addition, the SL PRS may cooperate with first indication information, facilitating transmission of the SL PRS in a case in which no base station participates in scheduling and a physical layer channel structure form is different from those on an existing uplink and downlink, and also facilitating positioning of sidelink based on the SL PRS.

DETAILED DESCRIPTION OF THE EMBODIMENTS

To make the technical problems to be solved, technical solutions, and advantages of the present application clearer, the following describes the present application in detail with reference to the accompanying drawings and specific embodiments. In the following description, specific details such as specific configurations and components are provided only to help fully understand the embodiments of the present application. Therefore, a person skilled in the art should understand that various changes and modifications may be made to the embodiments described herein without departing from the scope and spirit of the present application. In addition, for clarity and simplicity, descriptions of known functions and constructions are omitted.

It should be understood that, "one embodiment" and "an embodiment" throughout this specification means that specific features, structures or characteristics related to embodiments may be included in at least one embodiment of the present application. Therefore, descriptions of "in one embodiment" or "in an embodiment" in various places throughout this specification are not necessarily referring to a same embodiment. In addition, the specific features, structures, or characteristics may be combined in one or more embodiments in any appropriate manner.

In the embodiments of the present application, it should be understood that, sequence numbers of the foregoing processes do not mean execution sequences. The execution sequences of the processes should be determined according to functions and internal logic of the processes, and should not be construed as any limitation on the implementation processes of the embodiments of the present disclosure.

It should be understood that, in this specification, the term "and/or" is merely an association relationship that describes associated objects, and represents that there may be three relationships. For example, A and/or B may represent three cases: only A exists, both A and B exist, and only B exists. In addition, the character "/" herein generally indicates an "or" relationship between the associated objects.

In the embodiments of the present application, it should be understood that, "B that is corresponding to A" means that B is associated with A, and B may be determined based on A. However, it should also be understood that, determining B based on A does not mean determining B based only on A, but instead B may be determined based on A and/or other information.

Figure 1:
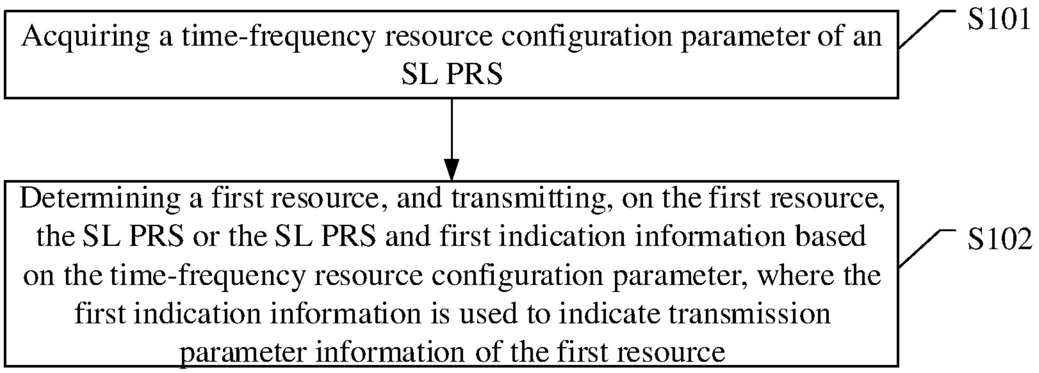
FIG. 1 is a schematic flowchart of a method for transmitting a sidelink positioning reference signal SL PRS according to the present application.

Referring to FIG. 1, an optional embodiment of the present application provides a method for transmitting a sidelink positioning reference signal SL PRS, which is applied to a first terminal and includes:

Step S101: acquiring a time-frequency resource configuration parameter of the SL PRS; and Step S102: determining a first resource, and transmitting, on the first resource, the SL PRS or the SL PRS and first indication information based on the time-frequency resource configuration parameter, where the first indication information is used to indicate transmission parameter information of the first resource.

An optional embodiment of the present application provides a method for transmitting an SL PRS, which is applied to a first terminal and specifically includes: acquiring a resource configuration parameter of an SL PRS before transmission, to make configuration be performed on a corresponding resource based on the resource configuration parameter, and the SL PRS be carried in the corresponding resource; transmitting the SL PRS to a corresponding second terminal during resource transmission; and further determining a first resource that is used to transmit the SL PRS, to make the SL PRS be carried in the first resource for transmission, so as to ensure a feasibility of transmitting the SL PRS. During transmission of the SL PRS on the first resource, only the SL PRS may be transmitted, or both the SL PRS and first indication information used to indicate transmission parameter information of the first resource are transmitted. In a specific embodiment, when time-frequency resource configuration information is determined by both the first terminal and the second terminal, only the SL PRS may be transmitted for positioning of sidelink; when information determined only by the first terminal exists in the time-frequency resource configuration information of the SL PRS, the SL PRS and the first indication information need to be transmitted on the first resource for positioning of the sidelink, so that the second terminal accurately learns all time-frequency resource configuration information of the SL PRS based on the first indication information, so as to ensure accurate transmission of the SL PRS.

In conclusion, in this embodiment of the present application, the time-frequency resource configuration parameter of the SL PRS is acquired, and the SL PRS is carried on a predetermined first resource and transmitted based on the time-frequency resource configuration parameter. In addition, the SL PRS may cooperate with first indication information, facilitating transmission of the SL PRS in a case in which no base station participates in scheduling and a physical layer channel structure form is different from those on an existing uplink and downlink, and also facilitating positioning of sidelink based on the SL PRS.

Optionally, according to the foregoing method for transmitting a sidelink positioning reference signal SL PRS, a first resource is determined from at least one of the following resource sets:

a first preset dedicated resource set; and a physical sidelink shared channel PSSCH resource set.

In an optional embodiment of the present application, the first resource may be determined from a single resource set, or may be determined from a plurality of resource sets, where the resource set includes but is not limited to the first preset dedicated resource set, the PSSCH resource set, and the like. In a specific embodiment, when the first resource is jointly determined by using the first preset dedicated resource set and the PSSCH resource set, the SL PRS may be carried on a resource in the first preset dedicated resource set, and the first indication information is carried on a resource in the PSSCH resource set.

Optionally, based on configuration of the first preset dedicated resource set, impact on a legacy terminal may be avoided, interference to the SL PRS by another signal may also be reduced, and a relatively large frequency domain bandwidth may be allocated to the SL PRS, thereby helping ensure positioning accuracy.

It should be noted that the resource set herein may alternatively be represented by a resource pool or the like.

Specifically, according to the foregoing method for transmitting a sidelink positioning reference signal SL PRS, the time-frequency resource configuration parameter includes at least one of the following:

time domain symbol quantity configuration information of the SL PRS;

time domain symbol location configuration information of the SL PRS;

frequency domain pattern configuration information of the SL PRS;

first frequency domain starting PRB configuration information of the SL PRS;

frequency domain starting sub-channel configuration information of the SL PRS;

first frequency domain bandwidth configuration information of the SL PRS, where a granularity of a first frequency domain bandwidth is a sub-channel or a PRB;

first period configuration information of the SL PRS; and sequence initialization ID configuration information of the SL PRS.

In a specific embodiment of the present application, the time-frequency resource configuration parameter of the SL PRS is described by using an example. In actual configuration, the time-frequency resource configuration parameter may include at least one of the foregoing configuration information.

It should be noted that each configuration information in the foregoing time-frequency resource configuration parameter may be configured by using RRC signaling or preconfigured, or determined based on information about the first terminal. When the configuration information is determined based on the information about the first terminal, an indication needs to be performed by using the first indication information, so that a receiver end may accurately receive the SL PRS based on the first indication information.

Figure 2:
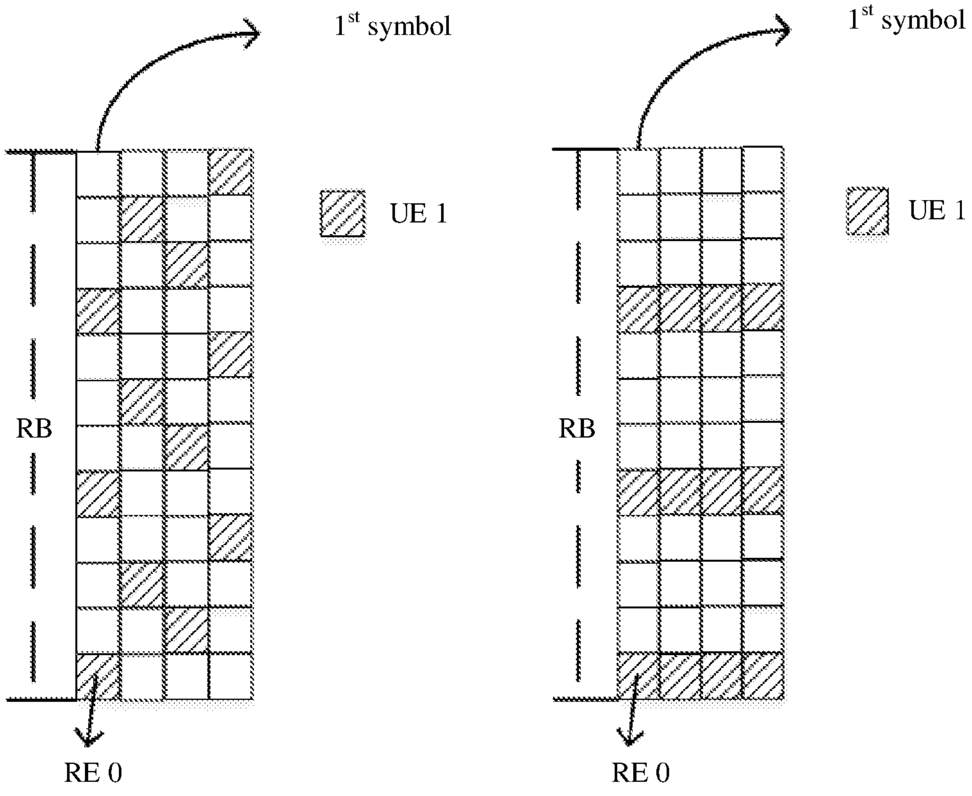
FIG. 2 is a schematic diagram of a frequency domain pattern in repeated mapping.

It should be further noted that in a specific embodiment of the present application, the frequency domain pattern configuration information of the SL PRS is a comb size information and includes but is not limited to a comb size, a start mapping RE (Resource Element) location of each PRB of a start symbol, and a mapping offset at an RE granularity on each symbol. For a case of repeated mapping on all symbols, only a start mapping RE location of each PRB in frequency domain is required. Referring to FIG. 2, the schematic diagram on the left side is obtained based on offset of a frequency domain pattern on the right side. For a user terminal (UE 1), a comb size is 4, a start mapping RE location (RE 0) on a PRB (or RB (resource block)) of a start symbol ($1^{st}$ symbol) is index=0, and an RE mapping offset on four symbols is {0, 2, 1, 3}.

It should be noted that a granularity of the first frequency domain bandwidth in the first frequency domain bandwidth configuration information of the SL PRS is a sub-channel or a PRB, and the time-frequency resource configuration parameter includes the first frequency domain starting PRB configuration information of the SL PRS, and may not include the frequency domain starting sub-channel configuration information of the SL PRS; or the time-frequency resource configuration parameter includes the frequency domain starting sub-channel configuration information of the SL PRS, and may not include the first frequency domain starting PRB configuration information of the SL PRS.

Further, according to the foregoing method for transmitting a sidelink positioning reference signal SL PRS, the first indication information is carried by using at least one of the following:

sidelink control information (SCI);

sidelink positioning information (SPI);

a media access control layer control element (MAC CE);

radio resource control (RRC) signaling;

a sidelink data packet;

a physical sidelink control channel (PSCCH);

a physical sidelink shared channel (PSSCH);

a physical sidelink broadcast channel (PSBCH);

a physical sidelink feedback channel (PSFCH);

a physical sidelink discover channel (PSDCH); and a physical sidelink positioning channel (PSPCH).

It should be noted herein that "SPI" is an indication information type used to indicate positioning related information on a sidelink, but a name of the indication information type used to indicate positioning related information is not limited to the SPI.

Specifically, according to the foregoing method for transmitting a sidelink positioning reference signal SL PRS, the transmission parameter information includes at least one of the following:

a number of time domain symbols of the SL PRS;

a time domain symbol location of the SL PRS;

a frequency domain pattern of the SL PRS;

a first frequency domain starting PRB of the SL PRS;

a frequency domain starting subchannel of the SL PRS;
a first frequency domain bandwidth of the SL PRS;
a first period of the SL PRS;
a sequence initialization ID of the SL PRS; and
identity information of the SL PRS.

It should be noted that, because the first indication information is used to indicate transmission parameter information of the first resource, a type of the transmission parameter information is corresponding to a type of a resource configuration parameter, and a quantity of types of transmission parameter information in actual transmission is corresponding to a quantity of types of the resource configuration parameter determined based on the information about the first terminal, thereby ensuring integrity of the first indication information during indication.

Optionally, according to the foregoing method for transmitting a sidelink positioning reference signal SL PRS, when the first resource is determined from the first preset dedicated resource set, a configuration parameter of the first preset dedicated resource set includes:

a symbol location occupied by the first preset dedicated resource set in each slot;
a second frequency domain starting PRB of the first preset dedicated resource set;
a second frequency domain bandwidth of the first preset dedicated resource set;
a second period of the first preset dedicated resource set;
a quantity of transmissions of the SL PRS in each period; and
a quantity of time domain resources between two adjacent SL PRSs in each period.

An occupying manner of the second frequency domain bandwidth includes at least one of fully occupying a current resource pool, spanning a plurality of resource pools, fully occupying an entire bandwidth part BWP, fully occupying an entire carrier, and occupying a preset quantity of PRBs.

Figure 3:
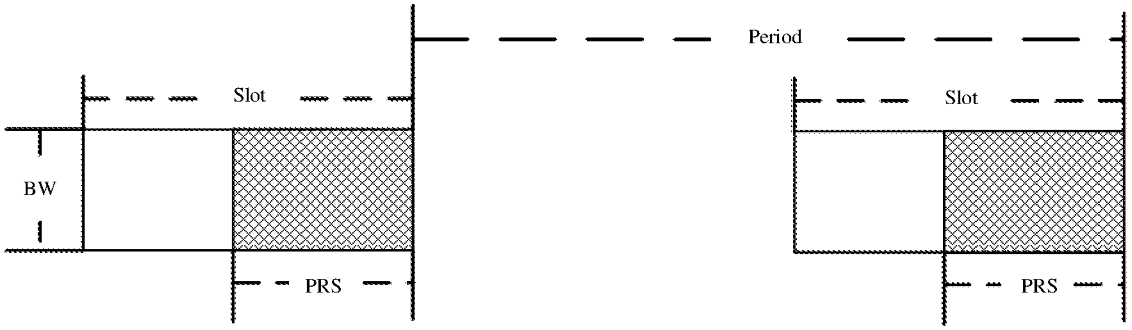
FIG. 3 is a schematic diagram of configuration of a first preset dedicated resource set.

In an optional implementation of the present application, when the first resource needs to be determined from the first preset dedicated resource set, the first preset dedicated resource set is first configured, that is, a symbol location in a slot, a second frequency domain starting PRB, a second frequency domain bandwidth, a second period, a quantity of transmissions of the SL PRS in each period, and a quantity of time domain resources between two adjacent SL PRSs in each period corresponding to the first preset dedicated resource set are first acquired by means of RRC signaling configuration or preconfiguration. As shown in FIG. 3, period is a period of a first preset dedicated resource, granularity is a slot, PRS is an SL PRS, and BW is a bandwidth. Configuration of the foregoing configuration parameters changes a structure of a slot, and has specific impact on calculation of a transport block size (TBS for short). Therefore, a new information field needs to be introduced in a first stage SCI to indicate the number of symbols occupied by the SL PRS or specific overheads occurred when the TBS is calculated in a current slot.

Specifically, the occupation manner of the second frequency domain bandwidth is further described by using an example in this embodiment. The second frequency domain bandwidth may fully occupy a current resource pool, span a plurality of resource pools, fully occupy an entire bandwidth part BWP, fully occupy an entire carrier, and/or occupy a preset quantity of PRBs. In actual use, the second frequency domain bandwidth may be determined based on an actual occupied bandwidth of the SL PRS.

Optionally, according to the foregoing method for transmitting a sidelink positioning reference signal SL PRS, when a plurality of first terminals share the first preset dedicated resource set, the method includes any one of the following:

matching a mapping location of the SL PRS and/or a code division multiplexing manner used by the SL PRS with a user identity of a first terminal or a second terminal, where the code division multiplexing manner is an orthogonal coverage code OCC or a cyclic shift CS; or
matching a mapping location of the SL PRS and/or a code division multiplexing manner used by the SL PRS with a resource mapping location of SL PRS request signaling transmitted by a second terminal; or
transmitting the SL PRS and at least one of a PSCCH, a PSSCH, and a PSPCH in the first preset dedicated resource set; or
transmitting the SL PRS in the first preset dedicated resource set, and transmitting at least one of a PSCCH, a PSSCH, and a PSPCH in a remaining resource set of a slot in which the SL PRS is located or in a first slot spaced from the first preset dedicated resource set by a preset quantity of time domain resources.

The PSCCH, the PSSCH, or the PSPCH is used to carry user information of the first terminal and time-frequency resource information of the SL PRS, and the PSSCH or the PSPCH is further used to carry positioning information.

Figure 4:
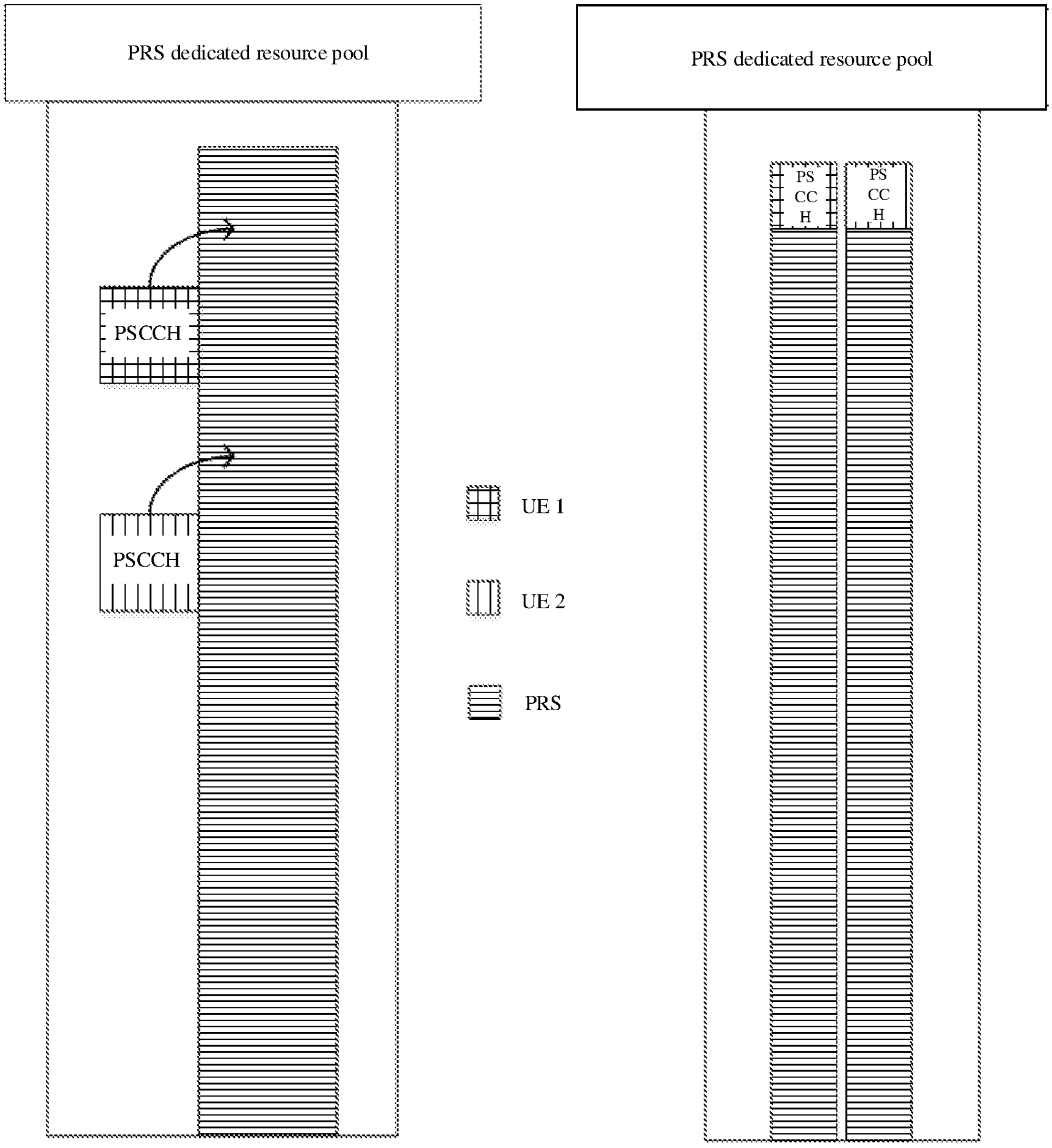
FIG. 4 is a schematic structural diagram of transmitting a PSCCH, a PSSCH, and an SL PRS on a first preset dedicated resource set.
Figure 5:
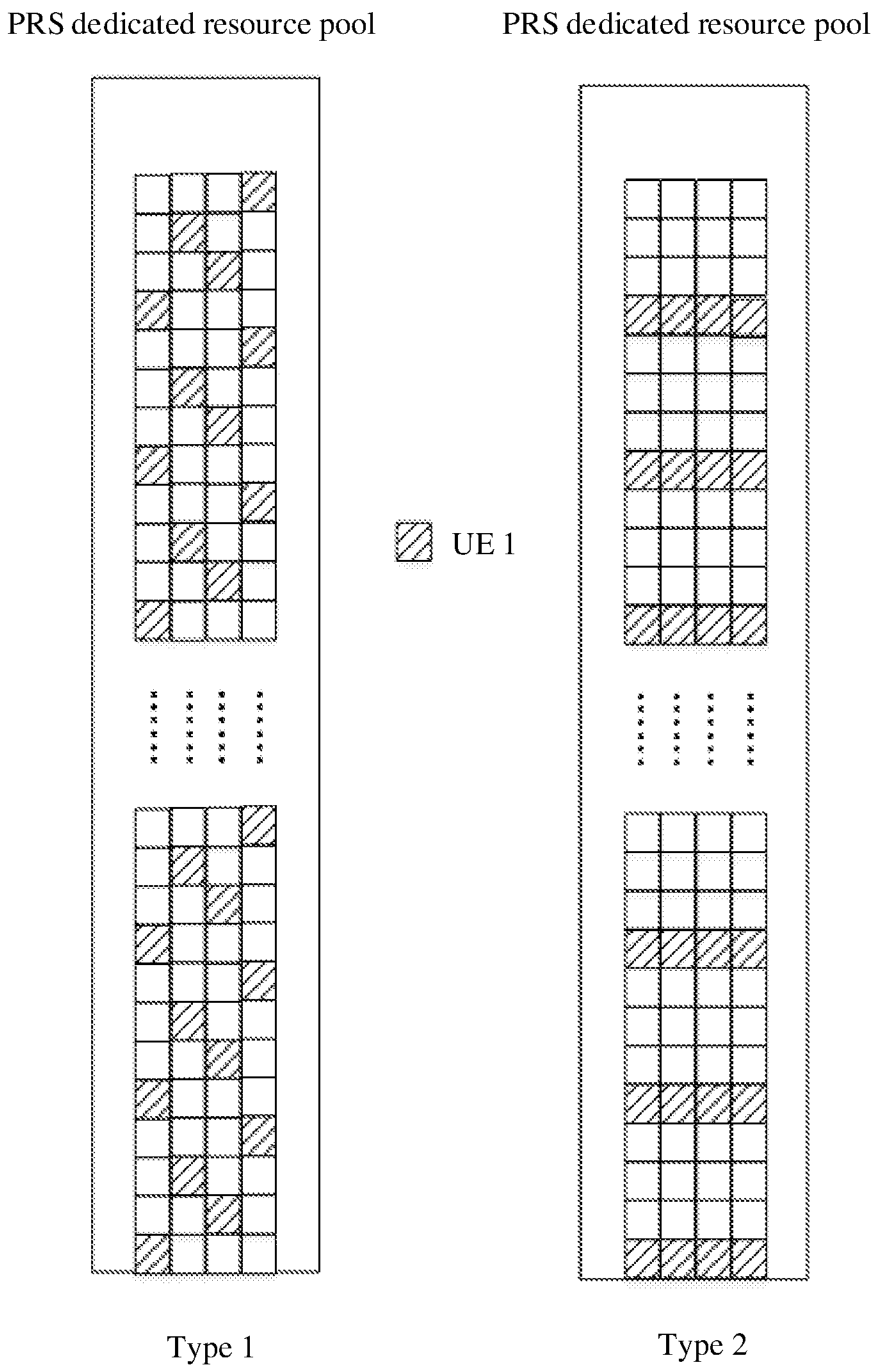
FIG. 5 is a schematic diagram 1 in which a plurality of user terminals reuse a same first preset dedicated resource set.

In another optional embodiment of the present application, a plurality of first terminals may reuse a same dedicated resource in the first preset dedicated resource set (PRS Dedicated Resource Pool). In this case, to ensure positioning accuracy, resources corresponding to different first terminals are orthogonal. For example, a correspondence between a mapping location of the SL PRS and/or a code division multiplexing manner used by the SL PRS and a resource mapping location of a terminal or SL PRS request signaling is established; or PSCCH, PSSCH, and/or PSPCH used to carry time-frequency resource information of the SL PRS and user information is transmitted in a remaining resource set of a same slot or in a first slot with an interval of a preset quantity of time domain resources, where the PSSCH or PSPCH is further used to carry positioning information (as shown in FIG. 4). Based on the foregoing operations, resources occupied by a plurality of user terminals may be orthogonal (as shown in FIG. 5). The user information includes but is not limited to a source ID of a user terminal.

It should be noted that whether the foregoing code division multiplexing manner is an orthogonal coverage code OCC or a cyclic shift CS is related to a sequence type used by the SL PRS. When a Gold sequence is used, the code division multiplexing manner is the OCC; when a ZC sequence is used, the code division multiplexing manner is the CS.

Figure 6:
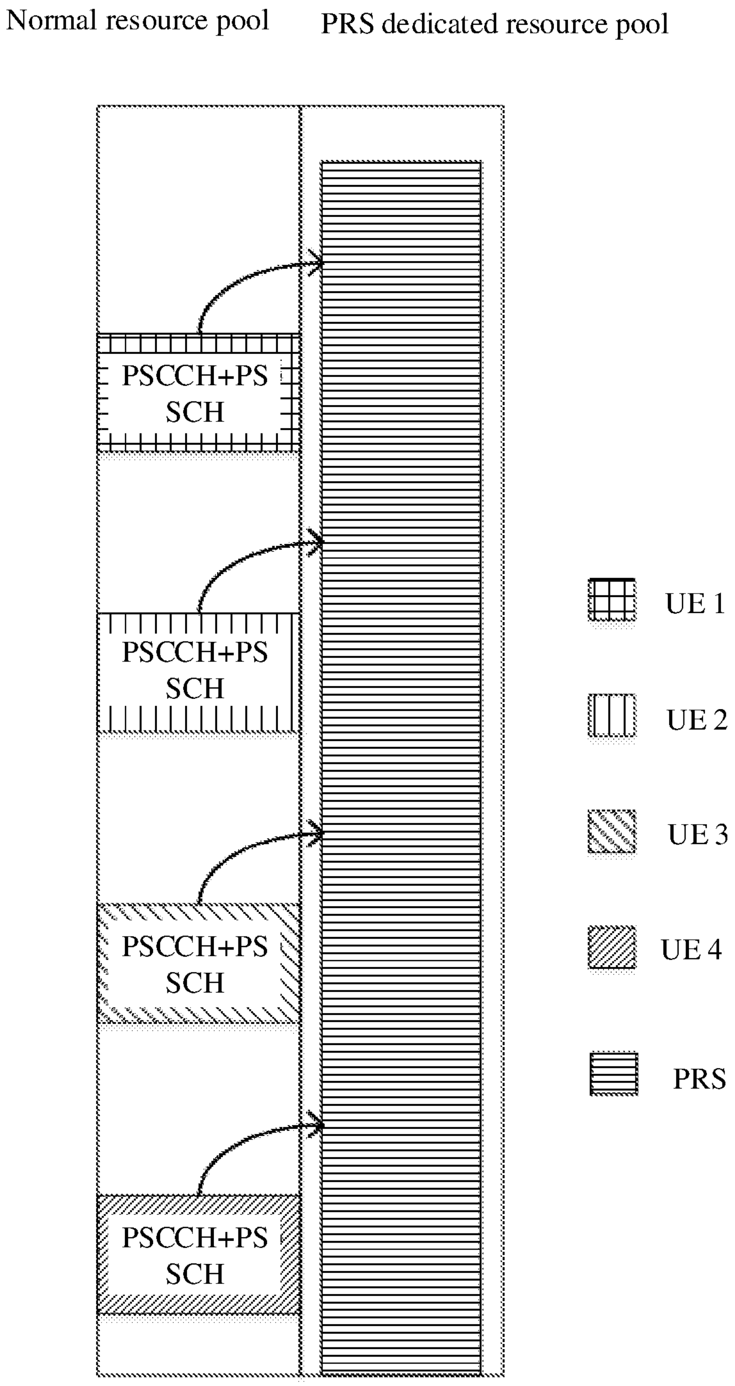
FIG. 6 is a schematic diagram 2 in which a plurality of user terminals reuse a same first preset dedicated resource set.

Specifically, the PSCCH, the PSSCH, and the PSPCH may be carried in the first preset dedicated resource set, a remaining resource of a slot in which the SL PRS is located or in the first slot spaced from the first preset dedicated resource set by a preset quantity of time domain resources, as shown in FIG. 6.

Specifically, according to the foregoing method for transmitting the sidelink positioning reference signal SL PRS, when the first resource is determined from the PSSCH resource set, the first frequency domain bandwidth of the SL PRS meets at least one of the following conditions:

the first frequency domain bandwidth is the same as a third frequency domain bandwidth of the PSSCH resource set;
the first frequency domain bandwidth fully occupies a current resource pool;

the first frequency domain bandwidth spans a plurality of resource pools;

the first frequency domain bandwidth fully occupies an entire BWP; and the first frequency domain bandwidth fully occupies an entire carrier.

Figure 7:
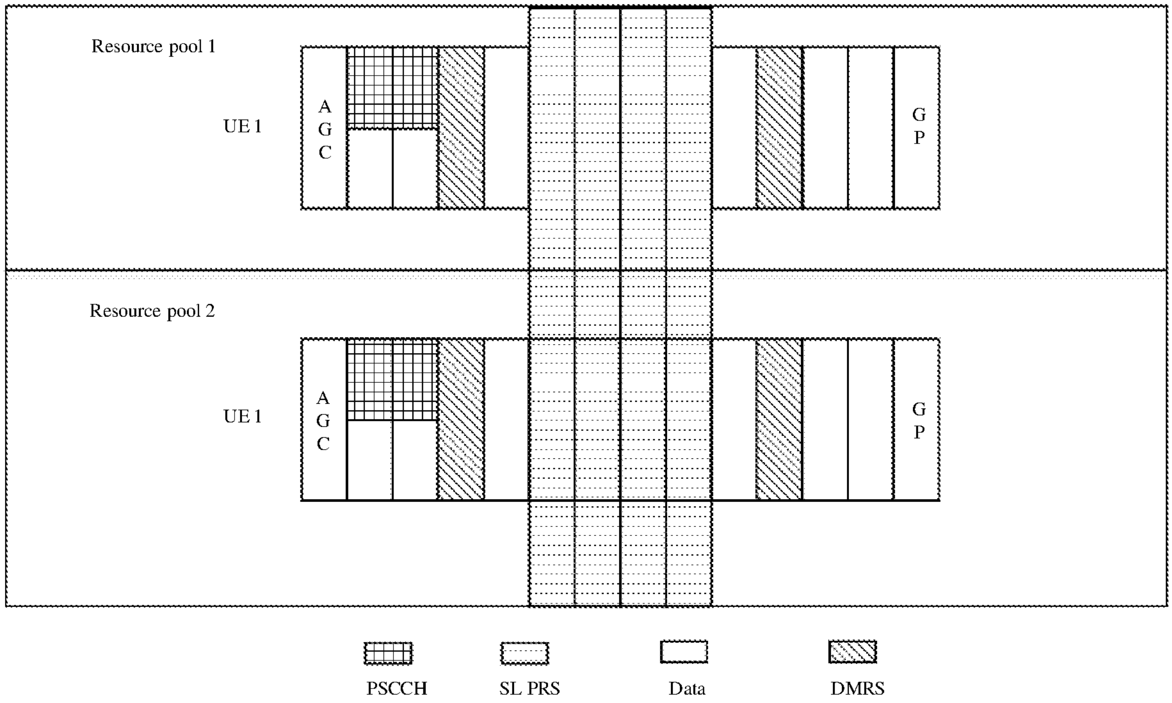
FIG. 7 is a schematic diagram in which a first frequency domain bandwidth spans a plurality of resource pools.

In another optional embodiment of the present application, when the first resource is determined from the PSSCH resource set, the first frequency domain bandwidth of the SL PRS is defined. The first frequency domain bandwidth may be the same as a third frequency domain bandwidth of the PSSCH resource set, fully occupy a current resource pool, span a plurality of resource pools, fully occupy an entire BWP, or occupy an entire carrier as required, which helps reduce resource waste while ensuring a transmission requirement. When the first frequency domain bandwidth fully occupies a current resource pool, spans a plurality of resource pools, fully occupies an entire BWP, or occupies an entire carrier (as shown in FIG. 7, where the first frequency domain bandwidth in FIG. 7 spans a plurality of resource pools, GP is guard period, and AGC is automatic gain control), so that a bandwidth occupied by the SL PRS is not limited, and positioning precision may be ensured to some extent.

Optionally, according to the foregoing method for transmitting the sidelink positioning reference signal SL PRS, only the SL PRS is transmitted on the first resource, or the SL PRS and at least one of the following is transmitted on the first resource:

a physical sidelink shared channel demodulation reference signal PSSCH DMRS; first SCI used for the decoding of a PSSCH;

second SCI used to indicate a transmission parameter and/or positioning information of the SL PRS;

dedicated information used to indicate a transmission parameter and/or positioning information of the SL PRS;

a MAC CE used to indicate a transmission parameter and/or positioning information of the SL PRS;

RRC signaling used to indicate a transmission parameter and/or positioning information of the SL PRS; and data information, where the data information is capable of being used to indicate positioning information.

Optionally, when the first resource is determined from the PSSCH resource set, in addition to the SL PRS, other information related to the SL PRS is further transmitted on the first resource, for example, at least one of PSSCH DMRS; first SCI used for the decoding of a PSSCH; second SCI used to indicate a transmission parameter and/or positioning information of the SL PRS; dedicated information, a MAC CE, and/or RRC signaling; data information indicating positioning information, and the like, so that the second terminal configured to receive the first resource may accurately learn a location and positioning information of the SL PRS.

It should be noted that the first SCI, the second SCI, and the dedicated information may be at least one of a first stage SCI, a second stage SCI, or a third stage SCI dedicated to indicating a transmission parameter and/or positioning information.

Optionally, according to the foregoing method for transmitting a sidelink positioning reference signal SL PRS, a mapping rule of the SL PRS on the first resource includes at least one of the following:

an orthogonal frequency division multiplexing OFDM symbol carrying the SL PRS being only used for mapping the SL PRS;

not mapping the SL PRS to an OFDM symbol that includes a first signal, where the first signal includes part or all of the first SCI, the PSSCH DMRS, a channel state information reference signal CSI RS, and a phase tracking reference signal PTRS;

when a resource conflict occurs between the SL PRS and part or all of the first signal, performing puncturing processing on the SL PRS, or performing puncturing processing on the first signal; and when a resource conflict occurs between the SL PRS and the data information, performing puncturing processing or rate matching processing on the data information.

In a specific embodiment of the present application, when the first resource is determined from the PSSCH resource set, mapping of the SL PRS on the first resource should be performed according to a preset mapping rule, where the mapping rule includes as follows.

Figure 8:
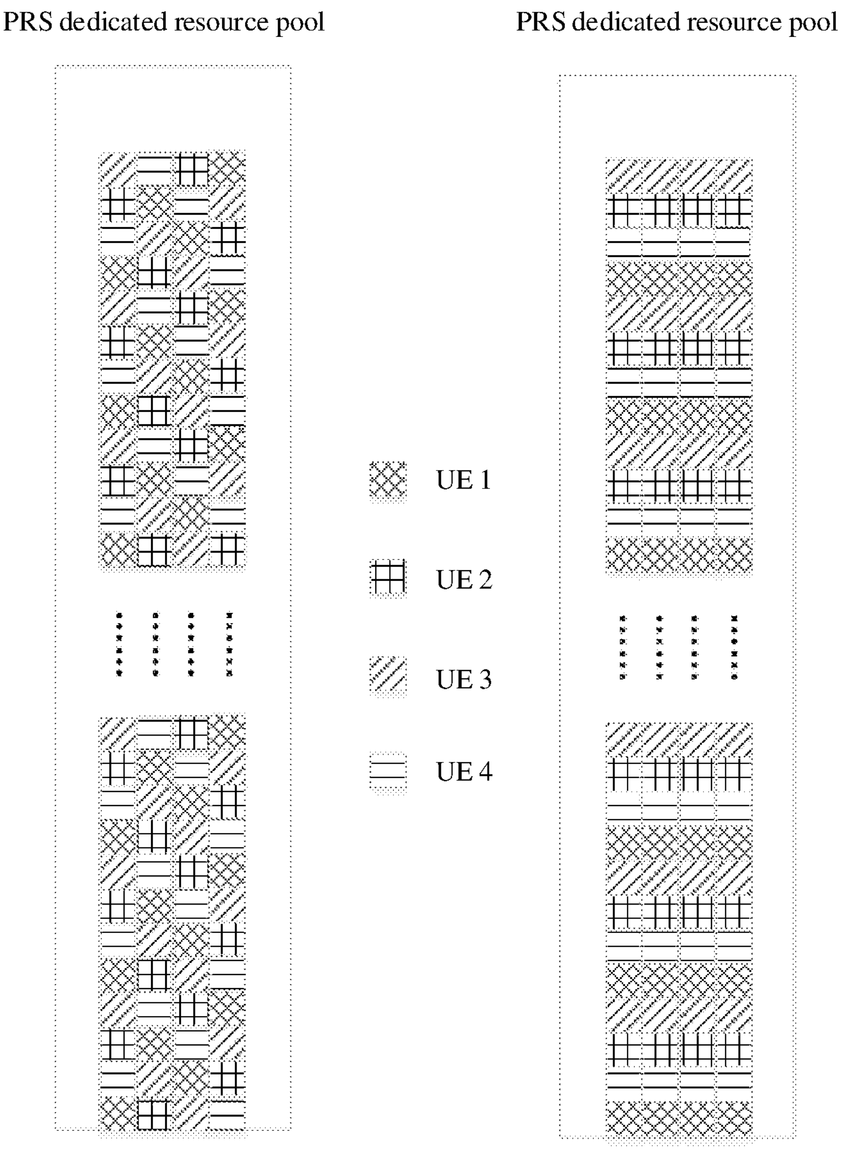
FIG. 8 is a schematic diagram of mapping only an SL PRS to a first preset dedicated resource set.

To avoid a resource conflict between the SL PRS and other information and reduction of a power spectral density (PSD for short) of the SL PRS, only the SL PRS rather than the other information is mapped to an OFDM symbol that carries the SL PRS. FIG. 8 is a schematic diagram of mapping only an SL PRS to a first preset dedicated resource set.

At the same time, because a resource conflict is prone to generate between the SL PRS and the first signal, it should be avoided that the SL PRS is mapped to an OFDM symbol including the first signal. The first signal includes but is not limited to part or all of a first SCI, a PSSCH DMRS, a channel state information reference signal (CSI RS for short), and a phase tracking reference signal (PTRS for short).

When other information is inevitably required to be mapped to an OFDM symbol that carries the SL PRS based on a resource limitation or the like, if a resource conflict occurs between the SL PRS and the other information, the SL PRS or the other information is processed based on a specific type of the other information. Specifically, the steps may be: when a resource conflict occurs between the SL PRS and part or all of the first signal, performing puncturing processing on the SL PRS, or performing puncturing processing on the first signal; when a resource conflict occurs between the SL PRS and the data information, performing puncturing processing or rate matching processing on the data information.

Figure 9:
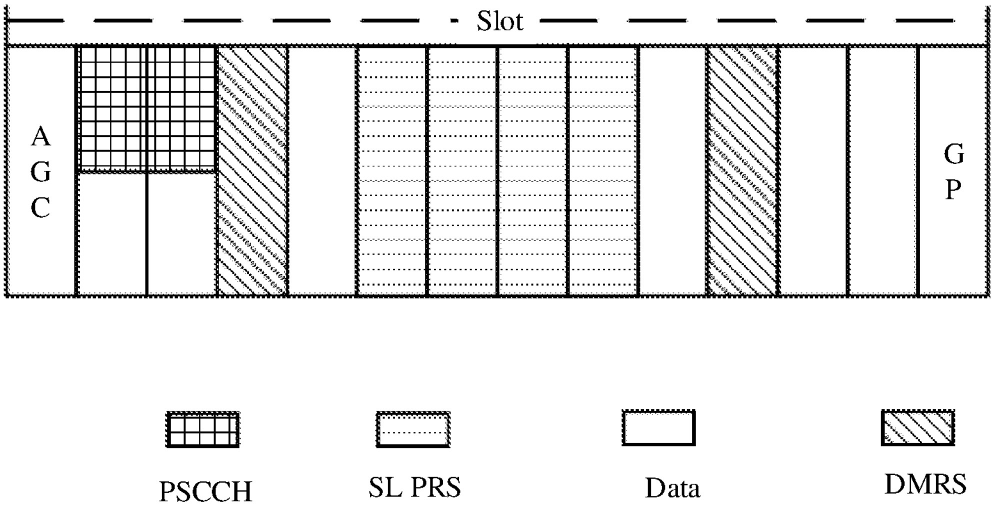
FIG. 9 is a schematic diagram in which an SL PRS, a PSCCH, data information Data, and a PSSCH DMRS are not multiplexed.
Figure 10:
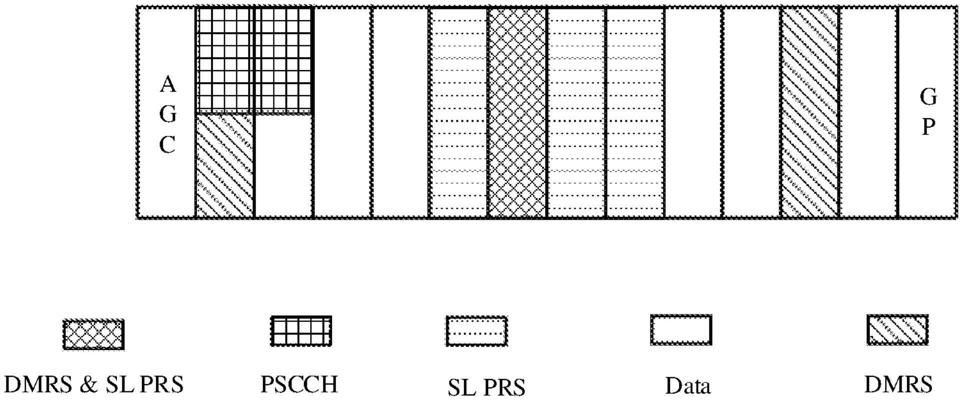
FIG. 10 is a schematic diagram in which an SL PRS and a PSSCH DMRS are multiplexed.

In a specific embodiment of the present application, a transmitting method used when the PSSCH carries the SL PRS, and the SL PRS and the PSSCH occupy a same bandwidth is used as an example for description. FIG. 9 is a schematic diagram in which an SL PRS, a PSCCH, data information Data, and a PSSCH DMRS are not multiplexed. FIG. 10 is a schematic diagram in which an SL PRS and a PSSCH DMRS are multiplexed. Specifically, when the PSSCH DMRS and the SL PRS are multiplexed, positioning may be directly performed by using the PSSCH DMRS or by using the PSSCH DMRS and the SL PRS. Further, when the PSSCH DMRS and the SL PRS are mapped to a same OFDM symbol, the PSSCH DMRS may be used as the SL PRS on the symbol.

Based on configuration of the SL PRS, compatibility of user terminals applicable to the R16 and the R17 is relatively good, and an original resource sensing mechanism is not damaged. Moreover, a first-stage SCI may not be modified, and it is not necessary to specifically set that a resource sensing reference signal in the R16 and the R17 must be the PSSCH DMRS.

It should be noted that the SL PRS may be consecutive in time domain, or may be discontinuous. In addition to being used for positioning, the SL PRS may be further used for assisting channel estimation. Specifically, for the foregoing method for transmitting a sidelink positioning reference signal SL PRS, when the first frequency domain bandwidth spans a plurality of resource pools, each corresponding resource pool is provided with a PSCCH and/or a PSSCH.

Figure 11:
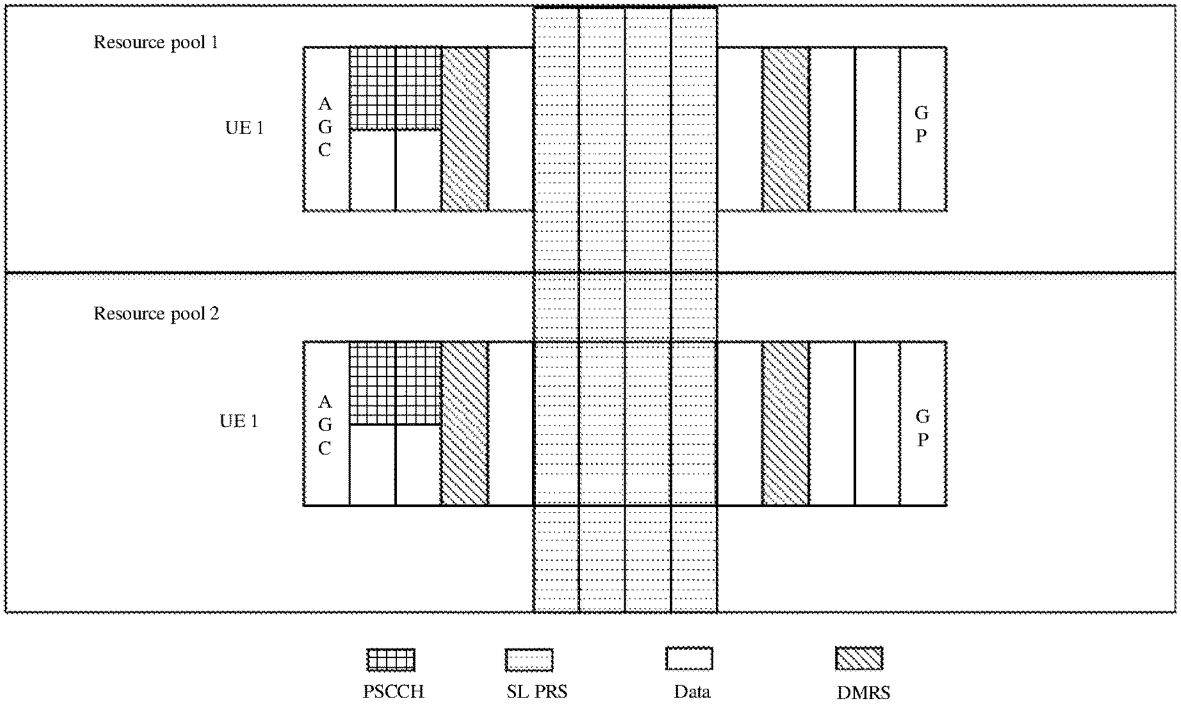
FIG. 11 is a schematic diagram 1 in which a plurality of resource pools spanned by a first frequency domain bandwidth are all provided with a PSCCH and/or a PSSCH.
Figure 12:
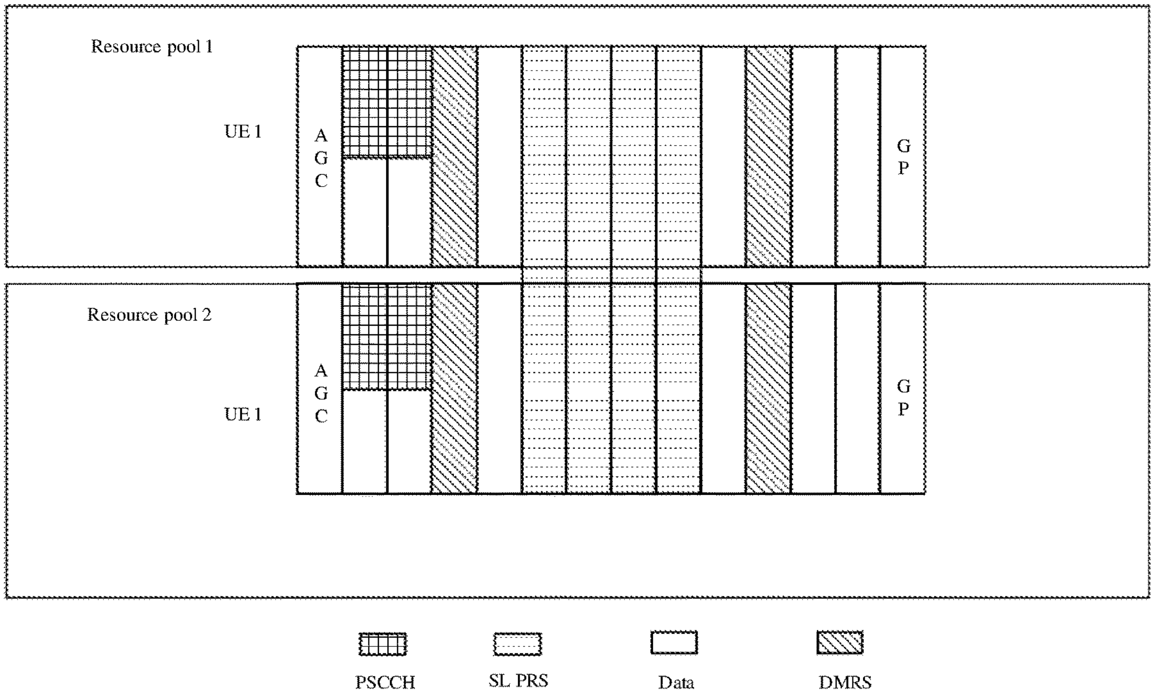
FIG. 12 is a schematic diagram 2 in which a plurality of resource pools spanned by a first frequency domain bandwidth are all provided with a PSCCH and/or a PSSCH.

It should be noted herein that, when the first resource is determined from the PSSCH resource set, a plurality of resource pools spanned by the first frequency domain bandwidth are provided with a PSCCH and/or a PSSCH (as shown in FIG. 11 or FIG. 12), so as to accurately learn the complete SL PRS.

Optionally, according to the foregoing method for transmitting a sidelink positioning reference signal SL PRS, when the SL PRS and the first indication information are transmitted on the first resource, the first SCI is transmitted on the plurality of resource pools that are spanned; and a plurality of the first SCI respectively indicate transmission configuration parameters of the PSSCH resource set in respective resource pools.

It should be noted herein that, when the first frequency domain bandwidth spans a plurality of resource pools, and the first resource is further used to transmit the first indication information, the first SCI is transmitted in each resource pool; and a plurality of the first SCI respectively indicate transmission configuration parameters of the PSSCH resource set in respective resource pools, so as to accurately learn the complete SL PRS by decoding the PSSCH.

Optionally, according to the foregoing method for transmitting a sidelink positioning reference signal SL PRS, when the SL PRS and the first indication information are transmitted on the first resource, the first indication information is transmitted on at least one resource pool of the plurality of resource pools that are spanned; and when the first indication information is transmitted on more than one resource pool, transmission configuration parameters indicated by a plurality of the first indication information are the same.

It should be noted herein that, when the first frequency domain bandwidth spans a plurality of resource pools, and the first resource is further used to transmit the first indication information, the first indication information is transmitted on all the plurality of resource pools that are spanned; and transmission configuration parameters indicated by a plurality of the first indication information are the same, so that the complete SL PRS is accurately learned.

Specifically, according to the foregoing method for transmitting the sidelink positioning reference signal SL PRS, the SL PRS sequence initialization ID is determined based on cyclic redundancy check CRC information of a first stage SCI, or is determined based on a positioning priority of the first terminal.

In a specific embodiment of the present application, a manner of acquiring the SL PRS sequence initialization ID in the time-frequency resource configuration parameter is specified. The SL PRS sequence initialization ID may be determined based on the cyclic redundancy check CRC information of the first stage SCI, and is generated by an information bit corresponding to the SL PRS sequence initialization ID, or is determined based on a positioning priority of the first terminal.

Optionally, according to the foregoing method for transmitting the sidelink positioning reference signal SL PRS, the first frequency domain starting PRB or the frequency domain starting sub-channel is determined based on any one of the following:

- a starting PRB location of a resource pool;
- a third frequency domain starting PRB location of a bandwidth part BWP;
- a frequency domain location of a resource block grid common reference point Point A;
- a starting PRB location of a PSCCH or a PSSCH; and
- a starting PRB location of a carrier.

In another optional embodiment of the present application, a manner of acquiring the first frequency domain starting PRB or the frequency domain starting sub-channel in the time-frequency resource configuration parameter of SL PRS is specified. The starting PRB location of a resource pool, the third frequency domain starting PRB location of a bandwidth part BWP, the frequency domain location of a resource block grid common reference point Point A, the starting PRB location of a PSCCH or a PSSCH, and the starting PRB location of a carrier may be all used as reference information of the first frequency domain starting PRB or the frequency domain starting sub-channel. During determining of the first frequency domain starting PRB or the frequency domain starting sub-channel, the reference information may be directly used as the first frequency domain starting PRB or the frequency domain starting sub-channel, or preset offset is performed on the foregoing reference information to obtain the first frequency domain starting PRB or the frequency domain starting sub-channel.

Figure 13:
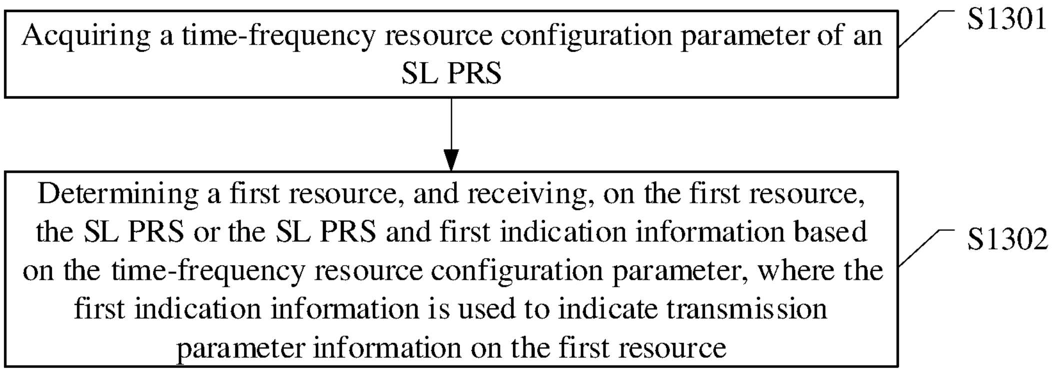
FIG. 13 is a schematic flowchart of a method for receiving a sidelink positioning reference signal SL PRS according to the present application.

Referring to FIG. 13, another optional embodiment of the present application further provides a method for receiving a sidelink positioning reference signal SL PRS, which is applied to a second terminal and includes:

- Step S1301: acquiring a time-frequency resource configuration parameter of the SL PRS; and
- Step S1302: determining a first resource, and receiving, on the first resource, the SL PRS or the SL PRS and first indication information based on the time-frequency resource configuration parameter, where the first indication information is used to indicate transmission parameter information of the first resource.

An optional embodiment of the present application provides a method for receiving an SL PRS that is applied to a second terminal. The method specifically includes: first acquiring a resource configuration parameter of the SL PRS when receiving the SL PRS; then receiving the SL PRS on a corresponding first resource based on the resource configuration parameter after a first resource used to transmit the SL PRS is determined; and when receiving the SL PRS on a first resource, receiving the SL PRS only based on a type of a transmission resource, or receiving the SL PRS and first indication information that is used to indicate transmission parameter information of the first resource. In a specific embodiment, when time-frequency resource configuration information is determined by both a first terminal and the second terminal, only the SL PRS may be received for positioning of sidelink; when information determined only by the first terminal exists in the time-frequency resource configuration information of the SL PRS, the SL PRS and the first indication information need to be received on the first resource for positioning of the sidelink, so that the second terminal accurately learns all time-frequency resource configuration information of the SL PRS based on the first indication information, so as to ensure accurate transmission of the SL PRS.

In embodiments of the present application, a time-frequency resource configuration parameter of an SL PRS is acquired, and the SL PRS is received on a first resource based on the time-frequency resource configuration parameter. In addition, the SL PRS may cooperate with first indication information, facilitating transmission of the SL PRS in a case in which no base station participates in scheduling and a physical layer channel structure form is different from those on an existing uplink and downlink, and also facilitating positioning of sidelink based on the SL PRS.

Optionally, according to the foregoing method for receiving a sidelink positioning reference signal SL PRS, the first resource belongs to at least one of the following resource sets:

a first preset dedicated resource set; and a physical sidelink shared channel PSSCH resource set.

In an optional embodiment of the present application, the first resource may be determined from a single resource set, or may be determined from a plurality of resource sets, where the resource set includes but is not limited to the first preset dedicated resource set, the PSSCH resource set, and the like. In a specific embodiment, when the first resource is jointly determined by using the first preset dedicated resource set and the PSSCH resource set, the SL PRS may be carried on a resource in the first preset dedicated resource set, and the first indication information is carried on a resource in the PSSCH resource set.

Optionally, based on configuration of the first preset dedicated resource set, impact on a legacy terminal may be avoided, interference to the SL PRS by another signal may also be reduced, and a relatively large frequency domain bandwidth may be allocated to the SL PRS, thereby helping ensure positioning accuracy.

It should be noted that the resource set herein may alternatively be represented by a resource pool or the like.

Specifically, according to the foregoing method for receiving a sidelink positioning reference signal SL PRS, the time-frequency resource configuration parameter includes at least one of the following:

time domain symbol quantity configuration information of the SL PRS;

time domain symbol location configuration information of the SL PRS;

frequency domain pattern configuration information of the SL PRS;

first frequency domain starting PRB configuration information of the SL PRS;

frequency domain starting sub-channel configuration information of the SL PRS;

first frequency domain bandwidth configuration information of the SL PRS, where a granularity of a first frequency domain bandwidth is a sub-channel or a PRB;

first period configuration information of the SL PRS; and sequence initialization ID configuration information of the SL PRS.

In a specific embodiment of the present application, the time-frequency resource configuration parameter of the SL PRS is described by using an example. In actual configuration, the time-frequency resource configuration parameter may include at least one of the foregoing configuration information.

It should be noted that, each of the foregoing time-frequency resource configuration parameters may be configured by using RRC signaling or preconfigured, or determined based on indication of the first indication information. When it is determined based on the indication of the first indication information, it indicates that the part of information is determined based on information about the first terminal.

It should be further noted that in a specific embodiment of the present application, the frequency domain pattern configuration information of the SL PRS is in a comb size and includes but is not limited to a comb size, a start mapping RE location of each PRB of a start symbol, and a mapping offset at an RE granularity on each symbol. For a case of repeated mapping on all symbols, only a start mapping RE location in each PRB in frequency domain is required. Referring to FIG. 2, for a user terminal, a comb size is 4, a start mapping RE location on each PRB of a start symbol is index=0, and a mapping offset on each symbol is {0, 2, 1, 3}.

It should be noted that a granularity of the first frequency domain bandwidth in the first frequency domain bandwidth configuration information of the SL PRS is a sub-channel or a PRB, and the time-frequency resource configuration parameter includes the first frequency domain starting PRB configuration information of the SL PRS, and may not include the frequency domain starting sub-channel configuration information of the SL PRS; or the time-frequency resource configuration parameter includes the frequency domain starting sub-channel configuration information of the SL PRS, and may not include the first frequency domain starting PRB configuration information of the SL PRS.

Optionally, according to the foregoing method for receiving a sidelink positioning reference signal SL PRS, the first indication information is carried by using at least one of the following:

sidelink control information SCI;

sidelink positioning information SPI;

a media access control layer control element MAC CE;

radio resource control RRC signaling;

a sidelink data packet;

a physical sidelink control channel PSCCH;

a physical sidelink shared channel PSSCH;

a physical sidelink broadcast channel PSBCH;

a physical sidelink feedback channel PSFCH;

a physical sidelink discover channel PSDCH; and a physical sidelink positioning channel PSPCH.

It should be noted herein that "SPI" is an indication information type used to indicate positioning related information on a sidelink, but a name of the indication information type used to indicate positioning related information is not limited to the SPI.

Specifically, according to the foregoing method for receiving a sidelink positioning reference signal SL PRS, the transmission parameter information includes at least one of the following:

a number of time domain symbols of the SL PRS;

a time domain symbol location of the SL PRS;

a frequency domain pattern of the SL PRS;

a first frequency domain starting PRB of the SL PRS;

a frequency domain starting subchannel of the SL PRS;

a first frequency domain bandwidth of the SL PRS;

a first period of the SL PRS;

a sequence initialization ID of the SL PRS; and identity information of the SL PRS.

It should be noted that, because the first indication information is used to indicate transmission parameter information of the first resource, a type of the transmission parameter information is corresponding to a type of a resource configuration parameter, and a quantity of types of transmission parameter information in actual transmission is corresponding to a quantity of types of the resource configuration parameter determined based on the information about the first terminal, thereby ensuring integrity of the first indication information during indication.

Further, according to the foregoing method for receiving a sidelink positioning reference signal SL PRS, when the first resource belongs to the first preset dedicated resource set, a configuration parameter of the first preset dedicated resource set includes:

a symbol location occupied by the first preset dedicated resource set in each slot;

a second frequency domain starting PRB of the first preset dedicated resource set;

a second frequency domain bandwidth of the first preset dedicated resource set;

a second period of the first preset dedicated resource set;

a quantity of transmissions of the SL PRS in each period; and a quantity of time domain resources between two adjacent SL PRSs in each period.

An occupying manner of the second frequency domain bandwidth includes at least one of fully occupying a current resource pool, spanning a plurality of resource pools, fully occupying an entire bandwidth part BWP, fully occupying an entire carrier, and occupying a preset quantity of PRBs.

In an optional implementation of the present application, when the first resource needs to be determined from the first preset dedicated resource set, the first preset dedicated resource set is first configured, that is, a symbol location in a slot corresponding to the first preset dedicated resource set, a second frequency domain starting PRB, a second frequency domain bandwidth, a second period, a quantity of transmissions of the SL PRS in each period, and a quantity of time domain resources between two adjacent SL PRSs in each period are first acquired by means of RRC signaling configuration or preconfiguration, as shown in FIG. 3. Configuration of the foregoing configuration parameters changes a structure of a slot, and has specific impact on calculation of a TBS. Therefore, a new information field needs to be introduced in a first stage SCI to indicate a quantity of symbols occupied by the SL PRS or specific overheads occurred when the TBS is calculated in a current slot.

Specifically, the occupation manner of the second frequency domain bandwidth is further described by using an example in this embodiment. The second frequency domain bandwidth may fully occupy a current resource pool, span a plurality of resource pools, fully occupy an entire bandwidth part BWP, fully occupy an entire carrier, and/or occupy a preset quantity of PRBs. In actual use, the second frequency domain bandwidth may be determined based on an actual occupied bandwidth of the SL PRS.

Specifically, according to the foregoing method for receiving a sidelink positioning reference signal SL PRS, when the first resource belongs to a first preset dedicated resource set, the method further includes any one of the following:

determining, based on a user identity of the first terminal or the second terminal, a mapping location of the SL PRS and/or a code division multiplexing manner used by the SL PRS, where the code division multiplexing manner is an OCC or a CS; or determining, based on a resource mapping location of SL PRS request signaling transmitted by the second terminal, a mapping location of the SL PRS and/or a code division multiplexing manner used by the SL PRS; or determining user information of the first terminal and time-frequency resource information of the SL PRS based on a received PSCCH, PSSCH, or PSPCH, and/or determining positioning information based on the PSSCH or PSPCH. The PSCCH, the PSSCH, and the PSPCH are carried in the first preset dedicated resource set, a remaining resource of a slot in which the SL PRS is located or a first slot spaced from the first preset dedicated resource set by a preset quantity of time domain resources.

In another optional embodiment of the present application, a plurality of first terminals may reuse a same dedicated resource in the first preset dedicated resource set. In this case, to ensure positioning accuracy, resources corresponding to different first terminals are orthogonal, and therefore a plurality of resources are orthogonal during transmission according to a preset rule. Therefore, during receiving, a corresponding first resource needs to be determined again according to a preset rule, where a resource receiving manner corresponds to a resource transmitting manner. For example, when mapping is performed by using a user identity (as shown in FIG. 4), a mapping location of the SL PRS and/or a code division multiplexing manner used by the SL PRS is determined based on the user identity of the first terminal or the second terminal, so as to determine a corresponding SL PRS. When indication is performed by using at least one of a PSCCH, a PSSCH and a PSPCH (as shown in FIG. 5), the PSCCH, PSSCH, and/or PSPCH is acquired at a preset location, and user information of the first terminal and time-frequency resource information of the SL PRS are determined based on the PSCCH, PSSCH or PSPCH, and/or positioning information is determined based on the PSSCH or PSPCH. The user information includes but is not limited to a source ID of a user terminal.

Specifically, the PSCCH, the PSSCH, and the PSPCH may be carried in the first preset dedicated resource set, a remaining resource (a resource corresponding to a normal resource pool) of a slot in which the SL PRS is located or in the first slot spaced from the first preset dedicated resource set by a preset quantity of time domain resources, as shown in FIG. 6.

It should be noted that whether the foregoing code division multiplexing manner is an orthogonal coverage code OCC or a cyclic shift CS is related to a sequence type used by the SL PRS. When a Gold sequence is used, the code division multiplexing manner is the OCC; when a ZC sequence is used, the code division multiplexing manner is the CS.

Figure 14:
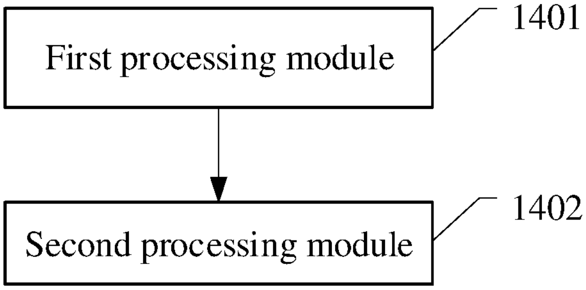
FIG. 14 is a schematic structural diagram of an apparatus for transmitting a sidelink positioning reference signal SL PRS according to the present application.

Referring to FIG. 14, still another optional embodiment of the present application further provides an apparatus for transmitting a sidelink positioning reference signal SL PRS, which is applied to a first terminal and includes:

a first processing module 1401, configured to acquire a time-frequency resource configuration parameter of the SL PRS; and a second processing module 1402, configured to: determine a first resource, and transmit, on the first resource, the SL PRS or the SL PRS and first indication information based on the time-frequency resource configuration parameter, where the first indication information is used to indicate transmission parameter information of the first resource.

Optionally, according to the foregoing transmitting apparatus, the first resource is determined from at least one of the following resource sets:

a first preset dedicated resource set; and a physical sidelink shared channel PSSCH resource set.

Specifically, according to the foregoing transmitting apparatus, the time-frequency resource configuration parameter includes at least one of the following:

time domain symbol quantity configuration information of the SL PRS; time domain symbol location configuration information of the SL PRS; frequency domain pattern configuration information of the SL PRS; first frequency domain starting PRB configuration information of the SL PRS; frequency domain starting subchannel configuration information of the SL PRS; first frequency domain bandwidth configuration information of the SL PRS, where a granularity of a first frequency domain bandwidth is a sub-channel or a PRB; first period configuration information of the SL PRS; and sequence initialization ID configuration information of the SL PRS.

Further, according to the foregoing transmitting apparatus, the first indication information is carried by using at least one of the following:

sidelink control information SCI; sidelink positioning information SPI; a media access control layer control element MAC CE; radio resource control RRC signaling; a sidelink data packet; a physical sidelink control channel PSCCH; a physical sidelink shared channel PSSCH; a physical sidelink broadcast channel PSBCH; a physical sidelink feedback channel PSFCH; a physical sidelink discover channel PSDCH; and a physical sidelink positioning channel PSPCH.

Specifically, according to the foregoing transmitting apparatus, the transmission parameter information includes at least one of the following:

a number of time domain symbols of the SL PRS; a time domain symbol location of the SL PRS; a frequency domain pattern of the SL PRS; a first frequency domain starting PRB of the SL PRS; a frequency domain starting subchannel of the SL PRS; a first frequency domain bandwidth of the SL PRS; a first period of the SL PRS; a sequence initialization ID of the SL PRS; and identity information of the SL PRS.

Optionally, according to the foregoing transmitting apparatus, when the first resource is determined from the first preset dedicated resource set, a configuration parameter of the first preset dedicated resource set includes:

a symbol location occupied by the first preset dedicated resource set in each slot; a second frequency domain starting PRB of the first preset dedicated resource set; a second frequency domain bandwidth of the first preset dedicated resource set; a second period of the first preset dedicated resource set; a quantity of transmissions of the SL PRS in each period; and a quantity of time domain resources between two adjacent SL PRSs in each period. An occupying manner of the second frequency domain bandwidth includes at least one of fully occupying a current resource pool, spanning a plurality of resource pools, fully occupying an entire bandwidth part BWP, fully occupying an entire carrier, and occupying a preset quantity of PRBs.

Optionally, when a plurality of first terminals share the first preset dedicated resource set, the foregoing transmitting apparatus further includes a fifth processing module, configured to:

match a mapping location of the SL PRS and/or a code division multiplexing manner used by the SL PRS with a user identity of a first terminal or a second terminal, where the code division multiplexing manner is an orthogonal coverage code OCC or a cyclic shift CS; or match a mapping location of the SL PRS and/or a code division multiplexing manner used by the SL PRS with a resource mapping location of SL PRS request signaling transmitted by a second terminal; or transmit the SL PRS and at least one of a PSCCH, a PSSCH, and a PSPCH on the first preset dedicated resource set; or transmit the SL PRS in the first preset dedicated resource set, and transmit at least one of a PSCCH, a PSSCH, and a PSPCH in a remaining resource set of a slot in which the SL PRS is located or in a first slot spaced from the first preset dedicated resource set by a preset quantity of time domain resources.

The PSCCH, the PSSCH, or the PSPCH is used to carry user information indicating the first terminal and time-frequency resource information of the SL PRS, and the PSSCH or the PSPCH is further used to carry positioning information.

Specifically, according to the foregoing transmitting apparatus, when the first resource is determined from the PSSCH resource set, the first frequency domain bandwidth of the SL PRS meets at least one of the following conditions:

the first frequency domain bandwidth is the same as a third frequency domain bandwidth of the PSSCH resource set; the first frequency domain bandwidth fully occupies a current resource pool; the first frequency domain bandwidth spans a plurality of resource pools; the first frequency domain bandwidth fully occupies an entire BWP; and the first frequency domain bandwidth fully occupies an entire carrier.

Optionally, according to the foregoing transmitting apparatus, only the SL PRS is transmitted on the first resource, or the SL PRS and at least one of the following is transmitted on the first resource:

a physical sidelink shared channel demodulation reference signal PSSCH DMRS; first SCI used for the decoding of a PSSCH; second SCI used to indicate a transmission parameter and/or positioning information of the SL PRS; dedicated information used to indicate a transmission parameter and/or positioning information of the SL PRS; a MAC CE used to indicate a transmission parameter and/or positioning information of the SL PRS; RRC signaling used to indicate a transmission parameter and/or positioning information of the SL PRS; and data information, where the data information is capable of being used to indicate positioning information.

Optionally, according to the foregoing transmitting apparatus, a mapping rule of the SL PRS on the first resource includes at least one of the following:

an orthogonal frequency division multiplexing OFDM symbol carrying the SL PRS being only used for mapping the SL PRS;

not mapping the SL PRS to an OFDM symbol that includes a first signal, where the first signal includes part or all of the first SCI, the PSSCH DMRS, a channel state information reference signal CSI RS, and a phase tracking reference signal PTRS;

when a resource conflict occurs between the SL PRS and part or all of the first signal, performing puncturing processing on the SL PRS, or performing puncturing processing on the first signal; and when a resource conflict occurs between the SL PRS and the data information, performing puncturing processing or rate matching processing on the data information.

Specifically, according to the foregoing transmitting apparatus, when the first frequency domain bandwidth spans a plurality of resource pools, each corresponding resource pool is provided with a PSCCH and/or a PSSCH.

Optionally, according to the foregoing transmitting apparatus, when the SL PRS and the first indication information are transmitted on the first resource, the first SCI is transmitted on the plurality of resource pools that are spanned; and a plurality of the first SCI respectively indicate transmission configuration parameters of the PSSCH resource set in respective resource pools.

Optionally, according to the foregoing transmitting apparatus, when the SL PRS and the first indication information are transmitted on the first resource, the first indication information is transmitted on at least one resource pool of the plurality of resource pools that are spanned; and when the first indication information is transmitted on more than one resource pool, transmission configuration parameters indicated by a plurality of the first indication information are the same.

Specifically, according to the foregoing transmitting apparatus, the SL PRS sequence initialization ID is determined based on cyclic redundancy check CRC information of a first stage SCI, or is determined based on a positioning priority of the first terminal.

Optionally, according to the foregoing transmitting apparatus, the first frequency domain starting PRB or the frequency domain starting sub-channel is determined based on any one of the following:

a starting PRB location of a resource pool; a third frequency domain starting PRB location of a bandwidth part BWP; a frequency domain location of a resource block grid common reference point Point A; a starting PRB location of a PSCCH or a PSSCH; and a starting PRB location of a carrier.

Embodiments of the transmitting apparatus in the present application are corresponding to the embodiments in the method for transmitting a sidelink positioning reference signal SL PRS applied to the first terminal. All implementation means in the foregoing embodiments of the method for transmitting a sidelink positioning reference signal SL PRS applied to the first terminal are applicable to the embodiments of the transmitting apparatus, and a same technical effect can be achieved.

Figure 15:
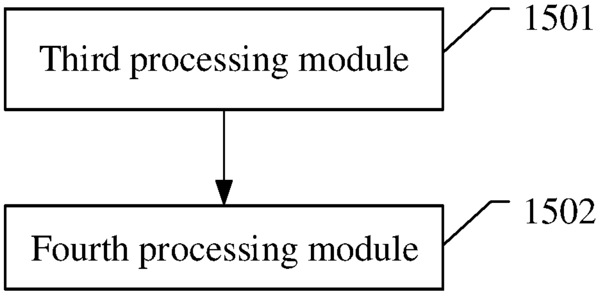
FIG. 15 is a schematic structural diagram of an apparatus for receiving a sidelink positioning reference signal SL PRS according to the present application.

Referring to FIG. 15, still another optional embodiment of the present application further provides an apparatus for receiving a sidelink positioning reference signal SL PRS, which is applied to a second terminal and includes:

a third processing module 1501, configured to acquire a time-frequency resource configuration parameter of the SL PRS; and a fourth processing module 1502, configured to: determine a first resource, and receive, on the first resource, the SL PRS or the SL PRS and first indication information based on the time-frequency resource configuration parameter, where the first indication information is used to indicate transmission parameter information of the first resource.

Optionally, according to the foregoing receiving apparatus, the first resource belongs to at least one of the following resource sets:

a first preset dedicated resource set; and a physical sidelink shared channel PSSCH resource set.

Specifically, according to the foregoing receiving apparatus, the time-frequency resource configuration parameter includes at least one of the following:

time domain symbol quantity configuration information of the SL PRS; time domain symbol location configuration information of the SL PRS; frequency domain pattern configuration information of the SL PRS; first frequency domain starting PRB configuration information of the SL PRS; frequency domain starting sub-channel configuration information of the SL PRS; first frequency domain bandwidth configuration information of the SL PRS, where a granularity of a first frequency domain bandwidth is a sub-channel or a PRB; first period configuration information of the SL PRS; and sequence initialization ID configuration information of the SL PRS.

Optionally, according to the foregoing receiving apparatus, the first indication information is carried by using at least one of the following:

sidelink control information SCI; sidelink positioning information SPI; a media access control layer control element MAC CE; radio resource control RRC signaling; a sidelink data packet; a physical sidelink control channel PSCCH; a physical sidelink shared channel PSSCH; a physical sidelink broadcast channel PSBCH; a physical sidelink feedback channel PSFCH; a physical sidelink discover channel PSDCH; and a physical sidelink positioning channel PSPCH.

Specifically, according to the foregoing receiving apparatus, the transmission parameter information includes at least one of the following:

a number of time domain symbols of the SL PRS; a time domain symbol location of the SL PRS; a frequency domain pattern of the SL PRS; a first frequency domain starting PRB of the SL PRS; a frequency domain starting subchannel of the SL PRS; a first frequency domain bandwidth of the SL PRS; a first period of the SL PRS; a sequence initialization ID of the SL PRS; and identity information of the SL PRS.

Further, according to the foregoing receiving apparatus, when the first resource belongs to the first preset dedicated resource set, a configuration parameter of the first preset dedicated resource set includes:

a symbol location occupied by the first preset dedicated resource set in each slot; a second frequency domain starting PRB of the first preset dedicated resource set; a second frequency domain bandwidth of the first preset dedicated resource set; a second period of the first preset dedicated resource set; a quantity of transmissions of the SL PRS in each period; and a quantity of time domain resources between two adjacent SL PRSs in each period. An occupying manner of the second frequency domain bandwidth includes at least one of fully occupying a current resource pool, spanning a plurality of resource pools, fully occupying an entire bandwidth part BWP, fully occupying an entire carrier, and occupying a preset quantity of PRBs.

Specifically, when the first resource belongs to the first preset dedicated resource set, the foregoing receiving apparatus further includes a sixth processing module, configured to:

determine, based on a user identity of a first terminal or the second terminal, a mapping location of the SL PRS and/or a code division multiplexing manner used by the SL PRS, where the code division multiplexing manner is an OCC or a CS; or determine, based on a resource mapping location of SL PRS request signaling transmitted by the second terminal, a mapping location of the SL PRS and/or a code division multiplexing manner used by the SL PRS; or determine user information of the first terminal and time-frequency resource information of the SL PRS based on a received PSCCH, PSSCH, or PSPCH, and/or determine positioning information based on the PSSCH or PSPCH. The PSCCH, the PSSCH, and the PSPCH are carried in the first preset dedicated resource set, a remaining resource of a slot in which the SL PRS is located or a first slot spaced from the first preset dedicated resource set by a preset quantity of time domain resources.

Embodiments of the receiving apparatus in the present application are corresponding to the embodiments in the method for receiving a sidelink positioning reference signal SL PRS applied to the second terminal. All implementation means in the foregoing embodiments of the method for receiving a sidelink positioning reference signal SL PRS applied to the second terminal are applicable to the embodiments of the receiving apparatus, and a same technical effect can be achieved.

Another optional embodiment of the present application further provides a computer-readable storage medium, on which a computer program is stored. When the computer program is executed by a processor, the method for transmitting a sidelink positioning reference signal SL PRS applied to a first terminal, or the method for receiving a sidelink positioning reference signal SL PRS applied to a second terminal is implemented.

In addition, reference numerals and/or letters may be repeated in different examples in the present application. Such repetition is for the purpose of simplification and clarity, and does not in itself indicate a relationship between various embodiments and/or settings discussed.

It should be further noted that in this specification, relational terms such as "first" and "second" are only used to distinguish one entity or operation from another, and do not necessarily require or imply that any actual relationship or sequence exists between these entities or operations. Moreover, the term "comprise", "include", or any other variant thereof is intended to cover a non-exclusive inclusion.

It should be noted that the foregoing module division is merely a logical function division. In actual implementation, all or a part of the modules may be integrated into one physical entity, or may be physically separated. In addition, these modules may be implemented in a form of software invoked by a processing element; or may be all implemented in a form of hardware; or some modules may be implemented in a form of software invoked by a processing element, and some modules may be implemented in a form of hardware. For example, a determining module may be a separately disposed processing element, or may be integrated into a chip of the foregoing apparatus for implementation. In addition, the determining module may be stored in a memory of the foregoing apparatus in a form of program code, and a processing element of the foregoing apparatus invokes the program code and executes a function of the determining module. An implementation of another module is similar. In addition, all or a part of the modules may be integrated together, or may be independently implemented. The processing element herein may be an integrated circuit having a signal processing capability. In an implementation process, the steps in the foregoing methods or the foregoing modules may be completed by an integrated logic circuit of hardware in the processor element or instructions in a form of software.

For example, modules, units, subunits, or submodules may be configured to implement one or more integrated circuits in the foregoing methods, for example, one or more application specific integrated circuits (ASIC), or one or more digital signal processors (DSP), or one or more field programmable gate arrays (FPGA), or the like. For another example, when a module is implemented in the form of program code being scheduled by a processing element, the processing element may be a general-purpose processor, for example, a central processing unit (CPU) or another processor capable of invoking the program code. For another example, these modules may be integrated together and implemented in a form of a system-on-a-chip (SOC).

The terms "first", "second" and the like in this specification and claims of the present disclosure are used to distinguish between similar objects, rather than to describe a particular order or a sequential order. It should be understood that the data used in this way may be interchangeable under appropriate circumstances such that embodiments of the present disclosure described herein are implemented, for example, in an order different from that illustrated or described herein. In addition, the terms "include" and "have" and any other variants thereof are intended to cover the non-exclusive inclusion. For example, a process, method, system, product, or device that includes a series of steps or units is not necessarily limited to those expressly listed steps or units, but may include other steps or units not expressly listed or inherent to such process, method, product, or device. In addition, in the specification and claims, "and/or" is used to indicate at least one of connected objects. For example, A and/or B and/or C represents the following seven cases: Only A is included, only B is included, only C is included, both A and B exist, both B and C exist, both A and C exist, and A, B and C all exist. Similarly, "at least one of A and B" used in this specification and claims should be understood as "Only A is included, only B is included, or both A and B exist".

The foregoing descriptions are optional implementations of the present application. It should only be noted that those of ordinary skill in the art may further make various improvements and modifications without departing from the principles of the present application, and these improvements and modifications also fall within the protection scope of the present application.

What is claimed is:

1. A method for transmitting a sidelink positioning reference signal (SL PRS), applied to a first terminal, comprising:

acquiring a time-frequency resource configuration parameter of the SL PRS; and determining a first resource, and transmitting, on the first resource, the SL PRS or the SL PRS and first indication information based on the time-frequency resource configuration parameter, wherein the first indication information is used to indicate transmission parameter information of the first resource;

wherein the first resource is determined from at least one of the following resource sets:

a first preset dedicated resource pool; and a physical sidelink shared channel (PSSCH) resource set;

wherein when the first resource is determined from the PSSCH resource set, only the SL PRS is transmitted on the first resource, or the SL PRS and at least one of the following is transmitted on the first resource;

a physical sidelink shared channel demodulation reference signal (PSSCH DMRS);

first SCI used for the decoding of a PSSCH;

second SCI used to indicate a transmission parameter and/or positioning information of the SL PRS;

dedicated information used to indicate a transmission parameter and/or positioning information of the SL PRS;

a MAC CE used to indicate a transmission parameter and/or positioning information of the SL PRS;

RRC signaling used to indicate a transmission parameter and/or positioning information of the SL PRS; and data information, wherein the data information is capable of being used to indicate positioning information;

wherein a mapping rule of the SL PRS on the first resource comprises at least one of the following:

an orthogonal frequency division multiplexing (OFDM) symbol carrying the SL PRS being only used for mapping the SL PRS;

not mapping the SL PRS to an OFDM symbol that comprises a first signal, wherein the first signal comprises part or all of the first SCI, the PSSCH DMRS, a channel state information reference signal (CSI RS), and a phase tracking reference signal (PTRS);

when a resource conflict occurs between the SL PRS and the PTRS, performing puncturing processing on the PTRS;

when a resource conflict occurs between the SL PRS and the data information, performing puncturing processing or rate matching processing on the data information; and OFDM symbols carrying the SL PRS are consecutive in time domain.

2. The method for transmitting the SL PRS according to claim 1, wherein the time-frequency resource configuration parameter comprises at least one of the following:

time domain symbol quantity configuration information of the SL PRS;

time domain symbol location configuration information of the SL PRS;

frequency domain pattern configuration information of the SL PRS;

first frequency domain starting PRB configuration information of the SL PRS;

frequency domain starting sub-channel configuration information of the SL PRS;

first frequency domain bandwidth configuration information of the SL PRS, wherein a granularity of a first frequency domain bandwidth is a sub-channel or a PRB;

first period configuration information of the SL PRS; and sequence initialization ID configuration information of the SL PRS.

3. The method for transmitting the SL PRS according to claim 1, wherein the first indication information is carried by using at least one of the following:

sidelink control information (SCI);

sidelink positioning information (SPI);

a media access control layer control element (MAC CE);

radio resource control (RRC) signaling;

a sidelink data packet;

a physical sidelink control channel (PSCCH);

a physical sidelink shared channel (PSSCH);

a physical sidelink broadcast channel (PSBCH);

a physical sidelink feedback channel (PSFCH);

a physical sidelink discover channel (PSDCH); and a physical sidelink positioning channel (PSPCH).

4. The method for transmitting the SL PRS according to claim 1, wherein the transmission parameter information comprises at least one of the following:

a number of time domain symbols of the SL PRS;

a time domain symbol location of the SL PRS;

a frequency domain pattern of the SL PRS;

a first frequency domain starting PRB of the SL PRS;

a frequency domain starting subchannel of the SL PRS;

a first frequency domain bandwidth of the SL PRS;

a first period of the SL PRS;

a sequence initialization ID of the SL PRS; and identity information of the SL PRS.

5. The method for transmitting the SL PRS according to claim 1, wherein when a plurality of first terminals share the first preset dedicated resource pool, the method comprises any one of the following:

matching a mapping location of the SL PRS and/or a code division multiplexing manner used by the SL PRS with a user identity of a first terminal or a second terminal, wherein the code division multiplexing manner is an orthogonal coverage code (OCC) or a cyclic shift (CS); or matching a mapping location of the SL PRS and/or a code division multiplexing manner used by the SL PRS with a resource mapping location of SL PRS request signaling transmitted by a second terminal; or transmitting the SL PRS and at least one of a PSCCH, a PSSCH, and a PSPCH in the first preset dedicated resource pool; or transmitting the SL PRS in the first preset dedicated resource pool, and transmitting at least one of a PSCCH, a PSSCH, and a PSPCH in a remaining resource set of a slot in which the SL PRS is located or in a first slot spaced from the first preset dedicated resource pool by a preset quantity of time domain resources, wherein the PSCCH, the PSSCH, or the PSPCH is used to carry user information indicating the first terminal and time-frequency resource information of the SL PRS, and the PSSCH or the PSPCH is further used to carry positioning information.

6. The method for transmitting the SL PRS according to claim 1, wherein a first frequency domain bandwidth of the SL PRS meets at least one of the following conditions:

the first frequency domain bandwidth is the same as a third frequency domain bandwidth of the PSSCH resource set;

the first frequency domain bandwidth fully occupies a current resource pool;

the first frequency domain bandwidth spans a plurality of resource pools;

the first frequency domain bandwidth fully occupies an entire BWP; and the first frequency domain bandwidth fully occupies an entire carrier.

7. The method for transmitting the SL PRS according to claim 2, wherein the SL PRS sequence initialization ID is determined based on cyclic redundancy check (CRC) information of a first stage SCI, or is determined based on a positioning priority of the first terminal.

8. The method for transmitting the SL PRS according to claim 4, wherein the first frequency domain starting PRB or the frequency domain starting sub-channel is determined based on any one of the following:

a starting PRB location of a resource pool;

a third frequency domain starting PRB location of a BWP;

a frequency domain location of a resource block grid common reference point Point A;

a starting PRB location of a PSCCH or a PSSCH; and a starting PRB location of a carrier.

9. A method for receiving a sidelink positioning reference signal (SL PRS), applied to a second terminal, comprising:

acquiring a time-frequency resource configuration parameter of the SL PRS; and determining a first resource, and receiving, on the first resource, the SL PRS or the SL PRS and first indication information based on the time-frequency resource configuration parameter, wherein the first indication information is used to indicate transmission parameter information of the first resource;

wherein the first resource belongs to at least one of the following resource sets:

a first preset dedicated resource pool; and a physical sidelink shared channel (PSSCH) resource set;

wherein when the first resource belongs to the PSSCH resource set, only the SL PRS is transmitted on the first resource, or the SL PRS and at least one of the following is transmitted on the first resource:

a physical sidelink shared channel demodulation reference signal (PSSCH DMRS);

first SCI used for the decoding of a PSSCH;

second SCI used to indicate a transmission parameter and/or positioning information of the SL PRS;

dedicated information used to indicate a transmission parameter and/or positioning information of the SL PRS;

a MAC CE used to indicate a transmission parameter and/or positioning information of the SL PRS;

RRC signaling used to indicate a transmission parameter and/or positioning information of the SL PRS; and data information, wherein the data information is capable of being used to indicate positioning information;

wherein a mapping rule of the SL PRS on the first resource comprises at least one of the following:

an orthogonal frequency division multiplexing (OFDM) symbol carrying the SL PRS being only used for mapping the SL PRS;

not mapping the SL PRS to an OFDM symbol that comprises a first signal, wherein the first signal comprises part or all of the first SCI, the PSSCH DMRS, a channel state information reference signal (CSI RS), and a phase tracking reference signal (PTRS);

when a resource conflict occurs between the SL PRS and the PTRS, performing puncturing processing on the PTRS;

when a resource conflict occurs between the SL PRS and the data information, performing puncturing processing or rate matching processing on the data information; and OFDM symbols carrying the SL PRS are consecutive in time domain.

10. The method for receiving the SL PRS according to claim 9, wherein the first indication information is carried by using at least one of the following:

sidelink control information (SCI);

sidelink positioning information (SPI);

a media access control layer control element (MAC CE);

radio resource control (RRC) signaling;

a sidelink data packet;

a physical sidelink control channel (PSCCH);

a physical sidelink shared channel (PSSCH);

a physical sidelink broadcast channel (PSBCH);

a physical sidelink feedback channel (PSFCH);

a physical sidelink discover channel (PSDCH); and a physical sidelink positioning channel (PSPCH).

11. The method for receiving the SL PRS according to claim 9, wherein the transmission parameter information comprises at least one of the following:

a number of time domain symbols of the SL PRS;

a time domain symbol location of the SL PRS;

a frequency domain pattern of the SL PRS;

a first frequency domain starting PRB of the SL PRS;

a frequency domain starting subchannel of the SL PRS;

a first frequency domain bandwidth of the SL PRS;

a first period of the SL PRS;

a sequence initialization ID of the SL PRS; and identity information of the SL PRS.

12. The method for receiving the SL PRS according to claim 9, wherein when the first resource belongs to the first preset dedicated resource pool, the method further comprises any one of the following:

determining, based on a user identity of a first terminal or the second terminal, a mapping location of the SL PRS and/or a code division multiplexing manner used by the SL PRS, wherein the code division multiplexing manner is an OCC or a CS; or determining, based on a resource mapping location of SL PRS request signaling transmitted by the second terminal, a mapping location of the SL PRS and/or a code division multiplexing manner used by the SL PRS; or determining user information of the first terminal and time-frequency resource information of the SL PRS based on a received PSCCH, PSSCH, or PSPCH, and/or determining positioning information based on the PSSCH or PSPCH, wherein the PSCCH, the PSSCH, and the PSPCH are carried in the first preset dedicated resource pool, a remaining resource of a slot in which the SL PRS is located or a first slot spaced from the first preset dedicated resource pool by a preset quantity of time domain resources.

13. An apparatus for transmitting a sidelink positioning reference signal (SL PRS), applied to a first terminal, comprising:

a memory, configured to store a computer program;

a processor, configured to execute the computer program, when the computer program is executed by the processor, the method according to claim 1 is implemented.

14. An apparatus for receiving a sidelink positioning reference signal (SL PRS), applied to a second terminal, comprising:

a memory, configured to store a computer program;

a processor, configured to execute the computer program, when the computer program is executed by the processor, the method according to claim 12 is implemented.

15. A non-transitory computer-readable storage medium, on which a computer program is stored, and when the computer program is executed by a processor, the method according to claim 1 is implemented.

16. A non-transitory computer-readable storage medium, on which a computer program is stored, and when the computer program is executed by a processor, the method according to claim 9 is implemented.

* * * * *